US012250123B2

(12) United States Patent
Wang et al.

(10) Patent No.: US 12,250,123 B2
(45) Date of Patent: Mar. 11, 2025

(54) CABLE NETWORK REGIONAL CONNECTIVITY PLANNING METHOD AND APPARATUS

(71) Applicant: City University of Hong Kong, Hong Kong (HK)

(72) Inventors: Tianjiao Wang, Linyi (CN); Zengfu Wang, Xi'an (CN); Moshe Zukerman, Hong Kong (HK); Bill Moran, Balwyn (AU)

(73) Assignee: City University of Hong Kong, Hong Kong (HK)

( * ) Notice: Subject to any disclaimer, the term of this patent is extended or adjusted under 35 U.S.C. 154(b) by 771 days.

(21) Appl. No.: 17/502,031

(22) Filed: Oct. 14, 2021

(65) Prior Publication Data

US 2023/0118359 A1    Apr. 20, 2023

(51) Int. Cl.
*H04L 45/12* (2022.01)
*H04L 12/44* (2006.01)
*H04L 41/12* (2022.01)

(52) U.S. Cl.
CPC .............. *H04L 41/12* (2013.01); *H04L 12/44* (2013.01); *H04L 45/12* (2013.01)

(58) Field of Classification Search
CPC ......... H04L 41/12; H04L 12/44; H04L 45/12; H04L 12/12
See application file for complete search history.

(56) References Cited

U.S. PATENT DOCUMENTS

| 10,425,280 B2 | 9/2019 | Zukerman et al. |
| 10,805,207 B2 | 10/2020 | Zukerman et al. |
| 11,228,523 B2 | 1/2022 | Zukerman et al. |

(Continued)

OTHER PUBLICATIONS

Z. Wang, Q. Wang, B. Moran and M. Zukerman, "Application of the Fast Marching Method for Path Planning of Long-haul Optical Fiber Cables With Shielding," IEEE Access, vol. 6, No. 1, pp. 41367-41378, Dec. 2018.

(Continued)

*Primary Examiner* — Jay P Patel
*Assistant Examiner* — Shehab A Alawdi
(74) *Attorney, Agent, or Firm* — Idea Intellectual Limited; Margaret A. Burke; Sam T. Yip

(57) ABSTRACT

The present invention provides a cable network planning method comprising: modelling the prespecified topology as a Steiner tree including a plurality of terminal nodes representing a plurality of cable landing stations (CLSs) to be installed respectively in a plurality of destination regions connected by the cable network, a plurality of Steiner nodes presenting a plurality of branching units (BUs) to be installed in the cable network, and a plurality of edges connecting the terminal nodes and Steiner nodes; constructing a directed acyclic graph (DAG); finding a Steiner minimal tree (SMT) by applying a DAG-Least-Cost-System algorithm; returning coordinates of Steiner nodes, terminal nodes of the SMT as locations of the BUs and the CLSs. The provided method enables inclusion of costs of the Steiner nodes by taking account of Steiner nodes with degree in excess of three such that more flexible BU branching structures and CLS locations alternatives can be considered.

16 Claims, 6 Drawing Sheets

(56) References Cited

U.S. PATENT DOCUMENTS

| | | | |
|---|---|---|---|
| 2011/0063292 A1* | 3/2011 | Holl | E21B 49/00 345/420 |
| 2012/0069051 A1* | 3/2012 | Hagbi | G06T 19/006 345/633 |
| 2013/0338984 A1* | 12/2013 | Braaksma | G01V 11/00 703/10 |
| 2014/0278311 A1* | 9/2014 | Dimitrov | G01V 20/00 703/6 |
| 2015/0248461 A1* | 9/2015 | Theeten | G06F 16/24524 707/718 |
| 2015/0248462 A1* | 9/2015 | Theeten | G06F 16/24524 707/688 |
| 2018/0188415 A1* | 7/2018 | Imhof | G06F 30/20 |
| 2019/0369290 A1 | 12/2019 | Zukerman et al. | |
| 2019/0370711 A1 | 12/2019 | Zukerman et al. | |
| 2021/0091546 A1 | 3/2021 | Bhattacharya | |
| 2021/0373199 A1 | 12/2021 | Zukerman et al. | |

OTHER PUBLICATIONS

Z. Wang, Q. Wang, M. Zukerman and B. Moran, "A Seismic Resistant Design Algorithm for Laying and Shielding of Optical Fiber Cables," IEEE/OSA Journal of Lightwave Technology, vol. 35, No. 14, pp. 3060-3074, Jul. 2017.

Z. Wang, Q. Wang, M. Zukerman, J. Guo, Y. Wang, G. Wang, J. Yang and B. Moran, "Multiobjective Path Optimization for Critical Infrastructure Links with Consideration to Seismic Resilience," Computer-Aided Civil and Infrastructure Engineering, vol. 32, No. 10, pp. 836-855, Oct. 2017.

Z. Wang, Q. Wang, B. Moran and M. Zukerman, "Terrain Constrained Path Planning for Long-haul Cables," Optics Express, vol. 27, No. 6, pp. 8221-8235, Mar. 2019.

Q. Wang, J. Guo, Z. Wang, E. Tahchi, X. Wang, B. Moran, and M. Zukerman, "Cost-Effective Path Planning for Submarine Cable Network Extension," IEEE Access, vol. 7, No. 1, pp. 61883-61895, May 2019.

Z. Wang, Q. Wang, B. Moran and M. Zukerman, "Optimal Submarine Cable Path Planning and Trunk-and-Branch Tree Network Topology Design," IEEE/ACM Transactions on Networking, vol. 28, No. 4, pp. 1562-1572, Aug. 2020.

T. Wang, X. Wang, Z. Wang, C. Guo, B. Moran, and M. Zukerman, "Optimal Tree Topology for a Submarine Cable Network With Constrained Internodal Latency," IEEE/OSA Journal of Lightwave Technology, vol. 39, No. 9, pp. 2673-2683, May 2021.

A. McCurdy et al., "Submarine telecoms industry report," Submarine Telecoms Forum, Inc., Sterling, Virginia, USA, Tech. Rep., Oct. 2020 (accessed on Mar. 10, 2021).[Online]. Available: https://subtelforum.com/products/submarine-telecoms-industry-report/.

TeleGeography, "Submarine cable frequently asked questions," https://subtelforum.com/frequently-asked-questions/, 2021 (accessed on Mar. 2021).

A. Markow, "Summary of Undersea Fiber Optic Network Technology and Systems," Oct. 2017.

"Offshore Renewable and Cable Awareness," Oct. 2019. [Online]. Available: https://kis-orca.org/subsea-cables/design/.

"Responses to the two follow-up questions directed to Paul Shorb," Sep. 2002.

D. Hale, personal communication, Mar. 2021.

Y. Ye, X. Jiang, G. Pan, and W. Jiang, Submarine Optical Cable Engineering. Academic Press, 2018.

W. Qiu, "Submarine Cables Crossing Egypt and their costs," Apr. 2020. [Online]. Available: https://www.submarinenetworks.com/en/services/research/submarine-cables-crossing-egypt-and-cost.

X. Wang, Z. Wang, E. Tahchi, and M. Zukerman, "Submarine cable path optimization based on weight selection of design considerations," Submitted for publication.

Q. Wang, Z. Wang, J. Guo, E. Tahchi, X. Wang, B. Moran, and M. Zukerman, "Path planning of submarine cables," in 2019 21st International Conference on Transparent Optical Networks (ICTON). IEEE, 2019, pp. 1-4.

"Global Multi-Resolution Topography Data Synthesis," Oct. 2019. [Online]. Available: https://www.gmrt.org/.

M. Zhao, T. W. Chow, P. Tang, Z. Wang, J. Guo, and M. Zukerman, "Route selection for cabling considering cost minimization and earthquake survivability via a semi-supervised probabilistic model," IEEE Transactions on Industrial Informatics, vol. 13, No. 2, pp. 502-511, 2016.

Q. Wang, J. Guo, Z. Wang, E. Tahchi, X. Wang, B. Moran, and M. Zukerman, "Cost-effective path planning for submarine cable network extension," IEEE Access, vol. 7, pp. 61883-61895, 2019.

Z. Wang, Q. Wang, B. Moran, and M. Zukerman, "Optimal submarine cable path planning and trunk-and-branch tree network topology design," IEEE/ACM Transactions on Networking, vol. 28, No. 4, pp. 1562-1572, 2020.

T. Wang, X. Wang, Z. Wang, C. Guo, W. Moran, and M. Zukerman, "Optimal tree topology for a submarine cable network with constrained internodal latency," Journal of Lightwave Technology, vol. 39, No. 9, pp. 2673-2683, 2021.

V. Eramo and F. Lavacca, "Processing and bandwidth resource allocation in multi-provider NFV cloud infrastructures interconnected by elastic optical networks," in 2018 20th International Conference on Transparent Optical Networks (ICTON). IEEE, 2018, pp. 1-6.

J. A. Sethian, Level set methods and fast marching methods: evolving interfaces in computational geometry, fluid mechanics, computer vision, and materials science. Cambridge university press, 1999, vol. 3.

E. N. Gilbert and H. O. Pollak, "Steiner minimal trees," SIAM Journal on Applied Mathematics, vol. 16, No. 1, pp. 1-29, 1968.

D. M. Warme, Spanning trees in hypergraphs with applications to Steiner trees. University of Virginia Charlottesville, VA, 1998.

P. Winter and M. Zachariasen, "Euclidean Steiner minimum trees: An improved exact algorithm," Networks: An International Journal, vol. 30, No. 3, pp. 149-166, 1997.

M. Caleffi, I. F. Akyildiz, and L. Paura, "On the solution of the steiner tree np-hard problem via physarum bionetwork," IEEE/ACM transactions on networking, vol. 23, No. 4, pp. 1092-1106, 2014.

E. Aharoni and R. Cohen, "Restricted dynamic steiner trees for scalable multicast in datagram networks," IEEE/ACM transactions on Networking, vol. 6, No. 3, pp. 286-297, 1998.

David Warme, Pawel Winter, Martin Zachariasen, "Software for Computing Steiner Trees," Jan. 2017. [Online]. Available: http://www.geosteiner.com/.

W. D. Smith, "How to find Steiner minimal trees in Euclidean d-space," Algorithmica, vol. 7, No. 1, pp. 137-177, 1992.

M. Fampa and K. M. Anstreicher, "An improved algorithm for computing Steiner minimal trees in Euclidean d-space," Discrete Optimization, vol. 5, No. 2, pp. 530-540, 2008.

Y. Sun, D. Rehfeldt, M. Brazil, D. Thomas, and S. Halgamuge, "A physarum-inspired algorithm for minimum-cost relay node placement in wireless sensor networks," IEEE/ACM Transactions on Networking, vol. 28, No. 2, pp. 681-694, 2020.

Z. Wang, Q. Wang, B. Moran, and M. Zukerman, "Application of the fast marching method for path planning of long-haul optical fiber cables with shielding," IEEE Access, vol. 6, pp. 41367-41378, 2018.

Z. Wang, Q. Wang, B. Moran, M. Zukerman, "Terrain constrained path planning for long-haul cables," Optics express, vol. 27, No. 6, pp. 8221-8235, 2019.

K. Eriksson, D. Estep, and C. Johnson, Applied mathematics: Body and soul: vol. 1: Derivatives and geometry in IR3. Springer Science & Business Media, 2013.

E. Tahchi, personal communication, Oct. 2016.

* cited by examiner

800

```
┌─────────────────────────────────────────┐ 802
│ Modelling the surface of the earth in the│
│ bounded closed region as an irregular    │
│ two-dimensional manifold comprising a    │
│ plurality of grid nodes in a             │
│ three-dimensional Euclidean space        │
└─────────────────────────────────────────┘
                    ↓
┌─────────────────────────────────────────┐ 804
│ Prespecifying a topology for the cable network │
└─────────────────────────────────────────┘
                    ↓
┌─────────────────────────────────────────┐ 806
│ Modelling the prespecified topology as a │
│ Steiner tree including a plurality of    │
│ terminal nodes representing the plurality│
│ of destination regions, a plurality of   │
│ Steiner nodes presenting a plurality of  │
│ BU locations, and a plurality of edges   │
│ connecting the terminal nodes and Steiner│
│ nodes                                    │
└─────────────────────────────────────────┘
                    ↓
┌─────────────────────────────────────────┐ 808
│ Finding a SMT with the least cost in the Steiner tree │
└─────────────────────────────────────────┘
                    ↓
┌─────────────────────────────────────────┐ 810
│ Returning coordinates of Steiner nodes of the SMT │
│ as locations of the BUs                  │
└─────────────────────────────────────────┘
                    ↓
┌─────────────────────────────────────────┐ 812
│ Returning coordinates of terminal nodes of the SMT │
│ as locations of the CLSs                 │
└─────────────────────────────────────────┘
                    ↓
┌─────────────────────────────────────────┐ 814
│ Finding geodesics corresponding to edges of the │
│ SMT as cable paths between the BUs and CLSs │
└─────────────────────────────────────────┘
```

FIG. 8

Algorithm 1 DAG-Least-Cost-System

Input:
  The graph $G = (V', E')$, $\mathbb{T}$ with a topological order and BU cost ($b_q$) for each mesh point.

Output:
  Coordinates of Steiner nodes $s_i, i = 1, \ldots, M$.

1: for $i = 1, \ldots, M$ do
2:   for each node $x_p \in A_i$ do
3:     if $i$ is a leaf in $\mathbb{T}$ then
4:       $\phi_p^i = c(x_p) + b_p; \pi(x_p) = \text{NIL};$
5:     else
6:       for each child $s_j$ of $s_i$ do
7:         $\pi(x_p, j) = \text{NIL};$
8:       end for
9:       $\phi_p^i = 0;$
10:     end if
11:   end for
12: end for
13: for $i = 1, \ldots, M$, $i$ is not a leaf do
14:   for each node $x_p \in A_i$ do
15:     for each child $s_j$ of $s_i$ do
16:       $\psi = \infty;$
17:       for each node $x_q \in A_j$ do
18:         if $x_q = x_p$ then
19:           $\psi' = \phi_q^j + w(x_q, x_p)$
20:         else
21:           $\psi' = \phi_q^j + w(x_q, x_p) + b_q$
22:         end if
23:         if $\psi > \psi'$ then
24:           $\psi = \psi';$
            $\pi(x_p, j) = q;$
25:         end if
26:       end for
27:       $\phi_p^i = \phi_p^i + \psi;$
28:     end for
29:     $\phi_p^i = \phi_p^i + c(x_p);$
30:   end for
31: end for
32: Let $\hat{p}_M = \arg\min_{x_p \in A_M} \phi_p^M$
33: Trace back from $\hat{p}_M$ to leaves via $\pi$;
34: return $x_{\hat{p}_1}, \ldots, x_{\hat{p}_M}$.

FIG. 9

CABLE NETWORK REGIONAL CONNECTIVITY PLANNING METHOD AND APPARATUS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to cable network planning. More specifically, the present invention relates to cable network regional connectivity planning.

BACKGROUND OF THE INVENTION

Submarine internet optical cables play an important and crucial role in global communications. Submarine cable systems typically have a trunk-and-branch tree topology as illustrated in FIG. 1. To be taken into account in their optimal design are cable laying costs (including terrain slope, materials, alternative protection level, labor, and cable survivability), installation costs of the submarine cable branching units (BUs), and the choice of locations of the submarine cable landing stations (CLSs).

A submarine optical cable system is conveniently divided into two parts: underwater equipment and onshore equipment. The underwater equipment includes submarine optical cables, repeaters, and BUs, whereas the onshore equipment includes CLSs. Submarine BUs are used to fork cables, allowing traffic to be routed to (or merged from) two or more different locations thus permitting a diversity of connections for the cable system.

Some earlier works of path planning optimization have been concentrating on point-to-point connectivity. For example, a raster-based method has been proposed to use the Dijkstra's algorithm for path planning to obtain the cable path with least cost. More recently, fast marching method (FMM)-based method was applied to cable path planning for designing a cable path from a start node to an existing cable network which may include a set of nodes at a minimal cost. For example, some FMM-based methods are proposed to achieve a trunk-and-branch tree network topology for submarine cable systems that connect multiple landing stations. However, these methods did not take account of installation costs of BUs and location choices of the CLSs in every region.

SUMMARY OF THE INVENTION

One objective of the present invention is to provide a method for planning regional connectivity of a cable network on a surface of the earth in a bounded closed region which can take account of installation costs of BUs and location choices of the CLSs.

According to one aspect of the present invention, the provided cable network planning method comprises: modelling the surface of the earth in the bounded closed region as an irregular two-dimensional manifold comprising a plurality of grid nodes in a three-dimensional Euclidean space; prespecifying a topology for the cable network; modelling the prespecified topology as a Steiner tree including a plurality of terminal nodes representing a plurality of cable landing stations (CLSs) to be installed respectively in a plurality of destination regions connected by the cable network, a plurality of Steiner nodes presenting a plurality of branching units (BUs) to be installed in the cable network, and a plurality of edges connecting the terminal nodes and Steiner nodes; finding a Steiner minimal tree (SMT) with the least cost in the Steiner tree by applying a DAG-Least-Cost-System algorithm; returning coordinates of Steiner nodes, terminal nodes of the SMT as locations of the BUs and the CLSs; and finding geodesics corresponding to edges of the SMT as cable paths between the BUs and CLSs.

The DAG-Least-Cost-System algorithm enables the inclusion of weights (costs) of the Steiner nodes by taking account of Steiner nodes with degree in excess of three. The DAG-Least-Cost-System algorithm can also be used to optimize not only connections between points, but also connections between regions.

Compared with existing methods, the provided cable network planning method can provide a computationally effective approach which can minimize the construction and installation costs of an entire cable system with consideration of more flexible BU branching structures and CLS locations alternatives.

BRIEF DESCRIPTION OF THE DRAWINGS

Embodiments of the invention are described in more detail hereinafter with reference to the drawings, in which:

FIG. 8 depicts a flowchart of a method for planning regional connectivity of a cable network on a surface of the earth in a bounded closed region in accordance with a preferred embodiment of the present invention;

FIG. 9 shows an exemplary implementation of DAG-Least-Cost-System algorithm.

DETAILED DESCRIPTION

In the following description, a method and an apparatus for planning regional connectivity of a cable network and the likes are set forth as preferred examples. Specific details may be omitted so as not to obscure the invention; however, the disclosure is written to enable one skilled in the art to practice the teachings herein without undue experimentation.

Figure 1:
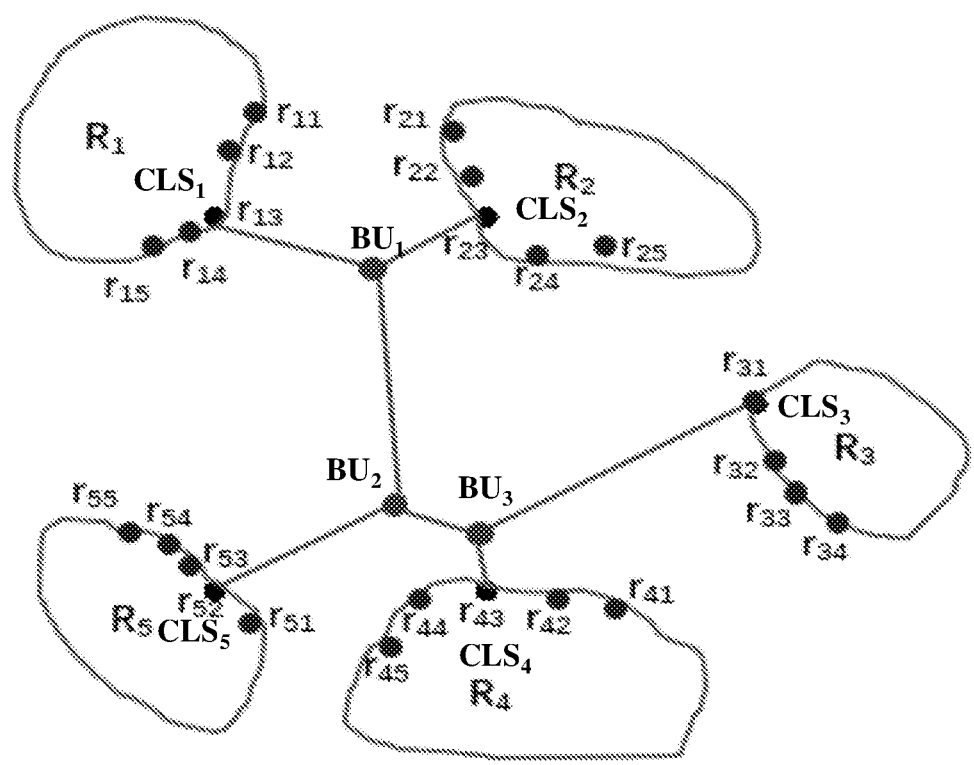
FIG. 1 depicts an outline of an optimization problem for planning regional connectivity of a cable network in accordance with a preferred embodiment of the present invention.

FIG. 1 depicts an outline of an optimization problem for planning regional connectivity of a cable network in accordance with a preferred embodiment of the present invention. Referring to FIG. 1, the cable network may connect a plurality of destination regions on a surface of the earth in a bounded closed region D. The destination regions are denoted as $R_1, R_2, \ldots, R_R \subseteq D$ (R is the number of regions) which are connected via a trunk and branch topology. It should be noted that although that each Ri is depicted as a region, the present invention can also be applicable to the case where some or all of the R is correspond to a specific point.

The cable network may include one or more branching units (BUs), denoted as BUS, to reduce total cable length of the network and influence the overall construction cost and one or more cable landing stations (CLSs), denoted as $CLS_j$, within the destination regions respectively. The construction costs of the cable network may include the costs of submarine cables, BUs and CLSs. Therefore, an optimal arrangement for the cable network would include number of BUs in the network and locations of CLSs.

Under different seabed conditions, the type and cost of a BU may vary. The cost of a BU is mainly determined by the number and complexity of fiber pairs in the cables. The choice of location (or even existence) of BUs needs to take account of, not only total cable length, but also overall network cost, water pressure and depth, topography, etc.

In each of the destination regions $R_i$, there may be more than one potential sites, $r_{i1}, r_{i2}, \ldots, r_{iLi}$ for the location of a CLS in each region Ri. Construction cost of CLS may vary from region to region and depend on many factors including, but not limited to:

1) Marine zoning and compatibility with different development and planning activities;
2) Easy access to landing points by the submarine cable installation vessel for installation and maintenance;
3) Terrain risks for cables at landing points, for example, avoidance of steep rocky coasts and areas of subsidence as well as steep, sandy or silty seafloors;
4) Environmental risks for cables such as storm surges and other marine disasters;
5) Avoidance of areas where corrosion (chemical pollution) of cables is likely;
6) Avoidance of areas of risk of cable damage by anchors and trawling nets.

Therefore, different locations may have different construction cost of CLS and result in different lengths of cables in the network.

The bounded closed region D may be modeled as a 2-dimensional manifold, where any pair of grid nodes in this region can be connected by a path on the 2-dimensional manifold. A triangulated piecewise-linear 2-dimensional manifold M may be used to model the region D. The "smoothly" continuous area D can be rendered as a triangulated manifold M, each grid node X on the manifold M being represented by coordinates (x; y; z); where z=ξ(x; y) is the altitude of (x; y).

For a cable represented by a Lipschitz continuous curve γ connecting two grid nodes in the manifold M, the total construction cost (based on the length) of the cable γ may be denoted by H(γ), as shown in Eq. (1), where f(x) is the laying (construction) cost per unit length of the cable passing through point x on the cable.

$$H(\gamma) = \int_0^{l(\gamma)} f(\gamma(s))ds \quad (1)$$

The value of f(x) may be obtained under an additive assumption that the cable laying cost accommodate several factors, including soil type, elevation, labor, licenses, protection level and the direction of the path.

The topology of the cable network T may be modelled as a Steiner topology (tree) V with Steiner nodes $s_i$ (i=1, 2, ..., M, M is the number of Steiner nodes) representing locations of BUs and terminal nodes $t_j$ (j=1, 2, ..., N, N is the number of terminal nodes) representing locations of CLSs within the destination regions respectively.

Figure 2:
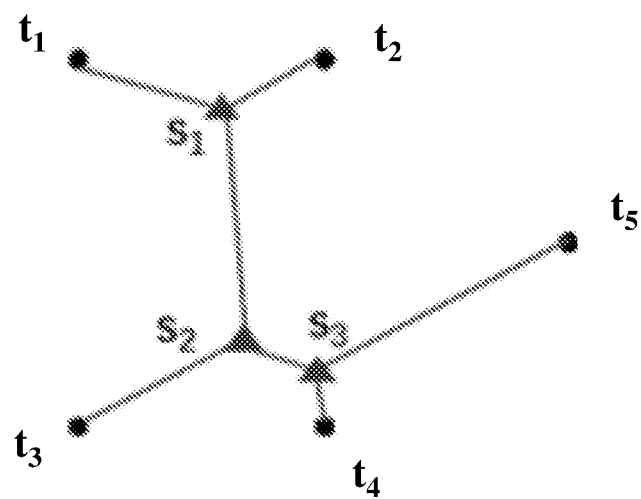
FIG. 2 shows a Steiner topology (tree) representing the cable network of FIG. 1.

FIG. 2 shows a Steiner topology (tree) representing the cable network of FIG. 1, where the Steiner nodes $s_1$ to $s_3$ representing locations of $BU_1$ to $BU_3$, and terminal nodes $t_1$ to $t_5$ representing locations of $CLS_1$ to $CLS_5$, respectively.

When a new Steiner node has the same location as one of the destination regions, the cost of the Steiner node, i.e., installation cost of the BU, can be ignored.

While in most cases, a BU is a Y-shaped cable connector connecting three terminal nodes, the present invention allows a cable network to have an optimal topology with BUs having number of branches greater than 3.

A single BU can be represented by a combination of a number of 3-branch BUs have the same location. In other words, in a Steiner tree representing a cable network, a K-degree Steiner node can be split into a (K−2) number of linked 3-degree Steiner nodes, with zero cost (and, thereby, zero length) edges joint them. The reverse conversion is also valid. That is, a (K−2) number of linked 3-degree Steiner nodes can be combined to form a K-degree Steiner node. For example, a combination of two 3-degree Steiner nodes will produce a 4-degree Steiner node, three linked 3-degree Steiner nodes will produce a 5-degree Steiner node, and so on.

Figure 3:
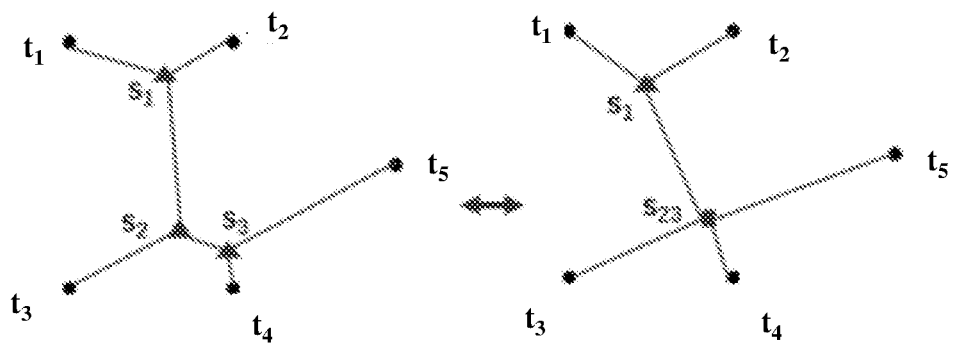
FIG. 3 shows how a new Steiner node is formed by combining two Steiner nodes with lower degrees.
Figure 4:
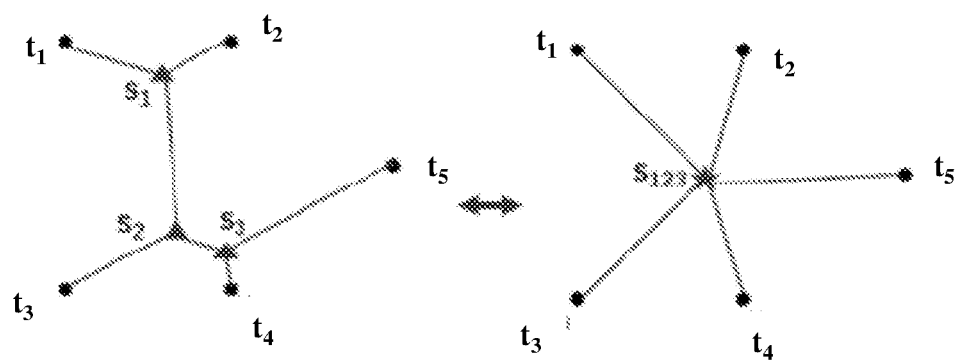
FIG. 4 shows how a new Steiner node is formed by combining three Steiner nodes with lower degrees.

FIG. 3 shows that a new Steiner node $S_{23}$ is combination of the Steiner nodes $S_2$ and $S_3$. FIG. 4 shows that the new Stiner node $S_{123}$ is a combination of the Steiner nodes $S_1$, $S_2$ and $S_3$.

By imposing the constraint that all terminal nodes and all Seiner nodes are grid nodes X on manifold M, the shortest path between every terminal node and Steiner node in the manifold M may be obtained by applying a fast marching method (FMM) using Eq. (1).

In particular, a cable $\gamma_{ij}$ segment that connects two grid nodes Xi, Xj, corresponding to a cable path between every terminal node and Steiner node, on the manifold M, a cumulative weighted cost, $c(X_i, X_j)$, over the cable path can be obtained using a cost model:

$$c(X_i, X_j) = \int_{X_i}^{X_j} f(X(s))ds \quad (2)$$

Note that the cable is not required to traverse edges of triangles of the manifold M and it is assumed that the cable can pass through the interior of triangles of the manifold M and FMM optimizes the path accordingly.

The total cost of the physical cable network T, as denoted by Ψ(T), may be minimized by solving a Steiner tree problem:

$$\min_X \Psi(X, \Gamma) = \min\left(\sum_{j \in S} \bar{c}(X_j) + \sum_{(i,j) \in E_2} \min_{\gamma_{ij}} c(X_i, X_j)\right) \quad (3)$$

where $\bar{c}(X_j) = \sum_{k \in N, (i,j) \in E_1} \min_{\gamma_{ij}} c(X_i, X_j)$ is the sum of the minimum cost from each terminal that is a neighbor of $X_j$ to $X_j$ itself, which can be calculated using FMM with the terminal being the source node (if no terminal is adjacent to the Steiner node $X_j$, $\bar{c}(X_j)=0$); $N=\{1, 2, \ldots, N\}$ is the index set of terminal nodes, $S=\{N+1, N+2, \ldots, N+M\}$ is the index set of Steiner nodes ($M \leq N-2$); $V=N \cup S$ represents the set of all terminal and Steiner nodes; X is the set of all grid nodes on manifold M; $\Gamma=\{\gamma(e)|e \in E\}$ is set of all cable paths; $E=E_1 \cup E_2$ is the set of all edges, where $E_1=\{(i,j)|i \in N, j \in S\}$ and $E_1=\{(i,j)|i \in N, j \in S\}$.

By solving the Steiner tree problem of Eq. (3), a Steiner minimal tree (SMT) may be found, the coordinates of the Steiner nodes of the SMT may be returned as the locations of the BUs and the coordinates of the terminal nodes of the SMT may be returned as the locations of the CLSs, and the geodesics corresponding to edges of the SMT may be found and returned as cable paths between the BUs and CLSs.

Figure 5:
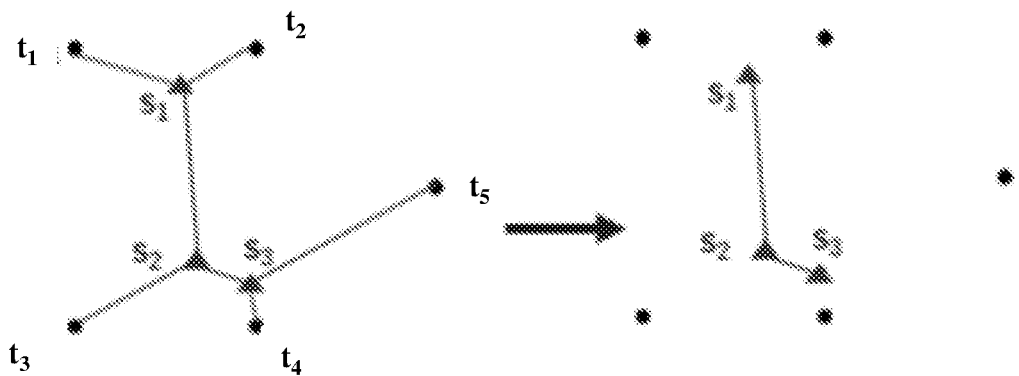
FIG. 5 shows how a skeleton tree is defined in the Steiner tree of FIG. 2.
Figure 6:
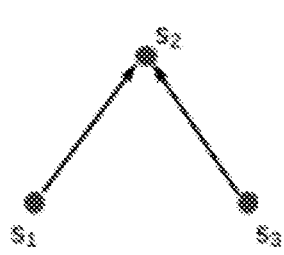
FIG. 6 shows how the skeleton tree of FIG. 5 becomes a directed rooted tree.

For solving the Steiner tree problem of Eq. (3), a skeleton tree $T_s$ is defined to be the subtree $T_s=(S, E_2)$ composed of only Steiner nodes and the edges connecting them to each other as illustrated in FIG. 5. For a tree with a Steiner topology, that is, with each Steiner node having three branches and each terminal node having three or less branches, an arbitrary Steiner node $s_r$ is chosen as the root of its skeleton tree Ts, $s_r \in T_s$. Next, the edges of the skeleton tree $T_s$ are assigned with an orientation towards the root $s_r$. As a result, the skeleton tree $T_s$ becomes a directed rooted tree (i.e., anti-arborescence) as shown in FIG. 6. Then, the nodes of the skeleton tree $T_s$ are topologically ordered so that children of a given node $s_i$ appear in the list earlier than the given node (that is, with arrows from them to $s_i$). Without loss of generality, the reordered Steiner node sequence may be denoted as $\overline{X}_i = X_{N+i}$, $i=1, 2, \ldots, M$, where M corresponds to the root $s_r$ of the skeleton tree $T_s$. The Steiner tree problem of Eq. (3) may be rewritten as:

$$\min_X \Psi(X, \Gamma) = \min_{\overline{X}_M, \overline{X}_{M-1}, \ldots, \overline{X}_1} \Phi(\overline{X}_M, \overline{X}_{M-1}, \ldots, \overline{X}_1) \quad (4)$$

where $$\Phi(\overline{X}_M, \overline{X}_{M-1}, \ldots, \overline{X}_1) = \quad (5)$$

$$\bar{c}(\overline{X}_M) + \sum_{(j,M) \in E_2, j \in C(M)} \min_{\gamma_{jM}} c(\overline{X}_j, \overline{X}_M) + \Phi(\overline{X}_M, \overline{X}_{M-1}, \ldots, \overline{X}_1)$$

where C(M) is the children set of node M.
For any leaf i of the skeleton tree, $\Phi(\overline{X}_i) = \bar{c}(\overline{X}_j)$.

$$\text{Let } \Phi^*(\overline{X}_M, \overline{X}_{M-1}, \ldots, \overline{X}_1) = \min_{\overline{X}_M, \overline{X}_{M-1}, \ldots, \overline{X}_1} \Phi(\overline{X}_M, \overline{X}_{M-1}, \ldots, \overline{X}_1) \quad (6)$$

Then, the problem shown in Eq. (3) is converted to a dynamic programming problem with Bellman equation:

$$\Phi^*(\overline{X}_M, \overline{X}_{M-1}, \ldots, \overline{X}_1) = \quad (7)$$

$$\min_{\overline{X}_M} \left[ \bar{c}(\overline{X}_M) + \sum_{(j,M) \in E_2, j \in C(M)} \min_{\gamma_{jM}} c(\overline{X}_j, \overline{X}_M) + + \Phi^*(\overline{X}_{M-1}, \ldots, \overline{X}_1) \right]$$

Figure 7:
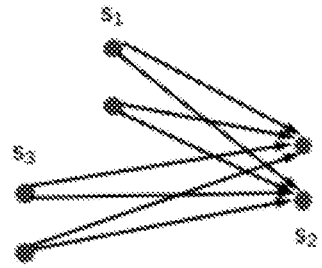
FIG. 7 shows how a plurality of directed acyclic graphs are constructed on basis of the directed rooted tree of FIG. 6.

To solve this dynamic programming problem, a plurality of directed acyclic graphs (DAGs), denoted as $G=(V', E')$, based on the skeleton tree is constructed, as shown in FIG. 7. Each Steiner node $i \in T_s$ is associated with a subset $A_i$ of V', where $A_i$ are grid nodes of the manifold M and the weight on each node is $\bar{c}_i(X)$. It follows that $V'=\cup_{i \in S} A_i$; that is, V' is composed of m copies of the grid nodes of the manifold M.

For an arc $e=(i, j) \in E_2$, where $s_j$ is the parent of $s_i$, a complete connection from node set $A_i$ to node set $A_j$ for the DAG is constructed, that is, an arc $\varepsilon=(p, q)$ from every node $X_p \in A_i$ to every node $X_q \in A_j$ in the DAG. The cost of the arc $\varepsilon$ is defined as the minimum cost from node $X_p$ to node $X_q$, which can be calculated by FMM, i.e., $w(\varepsilon)=w(p, q)=\min c(X_p, X_q)$. The minimum cumulative cost (MCC) for a node $X_p \in A_i$ may be defined by:

$$\phi_p^i = \bar{c}(X_p) + \sum_{j \in C(i)} \min_{q \in A_j} \left( w(X_q, X_p) + \phi_q^j \right) \quad (8)$$

For the problem of Steiner tree total cost optimization taking into account the cost of Steiner nodes (i.e., BUs in the cable system), the Bellman equation as shown in Eq. (7) may be extended to a new Bellman equation:

$$\Phi_{BU}^*(\overline{X}_M, \overline{X}_{M-1}, \ldots, \overline{X}_1) = \min_{\overline{X}_M} \left[ \Phi_{BU}^*(\overline{X}_{M-1}, \ldots, \overline{X}_1) + \right. \quad (9)$$

$$\left. (\bar{c}(\overline{X}_M) + b_M) + \sum_{(j,M) \in E_2, j \in C(M)} \min_{\gamma_{jM}} c(\overline{X}_j, \overline{X}_M) \right]$$

FIG. 8 depicts a flowchart of a method 800 for planning regional connectivity of a cable network on a surface of the earth in a bounded closed region in accordance with a preferred embodiment of the present invention. Referring to FIG. 8. The method 800 may comprise: a step 802: modelling the surface of the earth in the bounded closed region as an irregular two-dimensional manifold comprising a plurality of grid nodes in a three-dimensional Euclidean space; a step 804: prespecifying a topology for the cable network; a step 806: modelling the prespecified topology as a Steiner tree including a plurality of terminal nodes representing a plurality of CLSs to be installed respectively in a plurality of destination regions connected by the cable network, a plurality of Steiner nodes presenting a plurality of BUs to be installed in the cable network, and a plurality of edges connecting the terminal nodes and Steiner nodes; a step 808: finding a Steiner minimal tree (SMT) with the least cost in the Steiner tree; a step 810: returning coordinates of Steiner nodes of the SMT as locations of the BUs; a step 812: returning coordinates of terminal nodes of the SMT as locations of the CLSs; and a step 814: finding geodesics corresponding to edges of the SMT as cable paths between the BUs and CLSs.

The SMT may be found by defining a subtree consisted of only Steiner nodes and edges connecting the Steiner nodes to each other in the Steiner tree as a skeleton tree; choosing an arbitrary Steiner node in the skeleton tree as a root node of the skeleton tree; assigning an orientation to each of the edges toward to the root node; topologically ordering the Steiner nodes to obtain a sequence of the Steiner nodes so that children Steiner node of a given Steiner node appear in the sequence earlier than the given Steiner node; associating each of the Steiner nodes with a subset of grid nodes; constructing a directed acyclic graph (DAG) containing a plurality of directed paths, each consisted of grid nodes associated with different Steiner nodes and ended at a grid node associated with the root node; finding an optimal DAG with the least cost; and returning the optimal DAG as the SMT.

The optimal DAG by applying a DAG-Least-Cost-System algorithm as illustrated in FIG. 9. The DAG-Least-Cost- System algorithm may include: initializing a plurality of minimum cumulative costs (MCCs) corresponding to the grid nodes associated with the Steiner nodes respectively; updating a plurality of initialized MCCs for the grid nodes associated with the root node; finding a grid node with the smallest MCC among the grid nodes associated with the root node as an optimal root node; returning the DAG containing the optimal root node as the optimal DAG.

Preferably, each of the plurality of MCCs corresponding the grid nodes associated the Steiner nodes is initialized by: determining if the Steiner node is a leaf node of the skeleton tree; if the Steiner node is a leaf node of the skeleton tree, initializing a MCC for the grid node to be a sum of one or more minimum costs from neighboring terminal nodes to the grid node; and if the Steiner node is not a leaf node of the skeleton tree, initializing a MCC for the grid node to be zero.

Preferably, each of the minimum costs from neighboring terminal nodes to the grid node is obtained by applying a fast marching method. The fast marching method may comprise: generating one or more potential paths from the neighboring terminal to the grid node; calculating one or more costs for the one or more potential paths based on a cost model; and returning the smallest cost as the minimum cost for from the neighboring terminal to the grid node. The cost model may be modelled with a set of cost factors includes cable laying cost, BU construction cost and CLS construction costs.

Preferably, the plurality of initialized MCCs for the grid nodes associated with the root node may be updated by performing a plurality of iteration in the topological order for each of the grid nodes associated with each of the Steiner nodes in the skeleton tree.

Preferably, each of the iterations may comprise: determining if the Steiner node is a leaf node of the skeleton tree; if the Steiner node is not a leaf node of the skeleton tree, updating the initialized MCC for the grid node associated with the Steiner node by adding one or more MCC increments, each derived from a grid node associated with a child node of the Steiner node.

Preferably, each of the one or more MCC increments may be derived by: determining if the child node has the same location as the Steiner node; if the child node has the same location as the Steiner node, determining the MCC increment to be equal to a MCC for the grid node associated with the child node; and if the child node has a different location from the Steiner node, determining the MCC increment to be equal to a sum of the MCC for the grid node associated with the child node and a BU construction cost at the grid node associated with the Steiner node.

Figure 10:
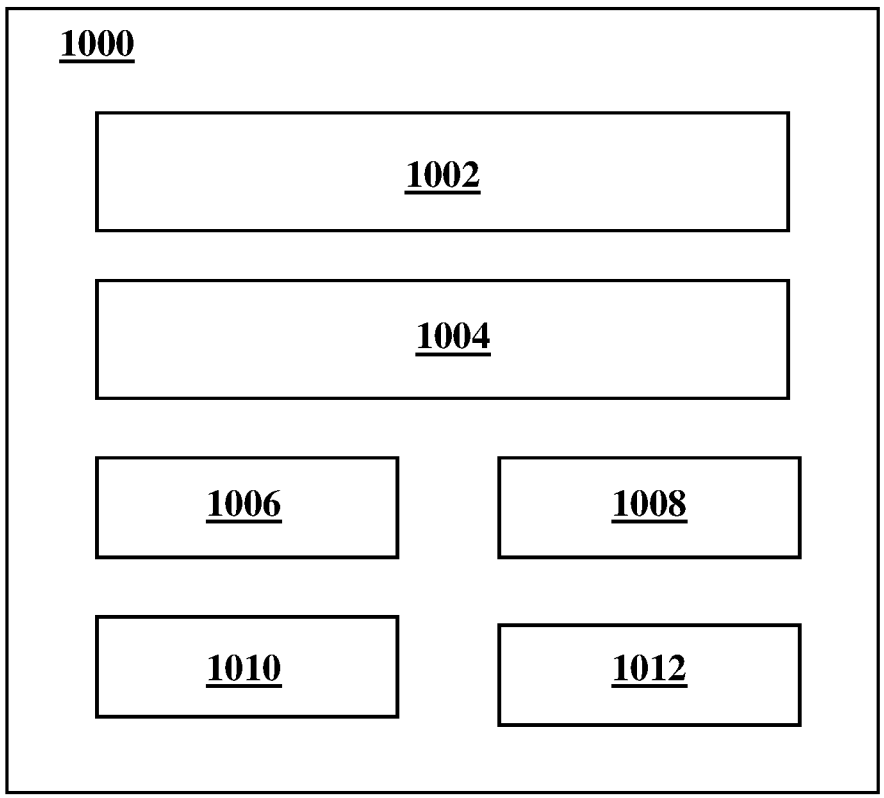
FIG. 10 shows an exemplary apparatus for performing or implementing the method for planning regional connectivity of a cable network in various embodiments of the invention.

FIG. 10 shows an exemplary apparatus 1000 for performing or implementing the method for planning regional connectivity of a cable network in various embodiments of the invention. For example, the apparatus 1000 may be computing devices including server computers, personal computers, laptop computers, mobile computing devices such as smartphones and tablet computers. Preferably, the apparatus 1000 may have different configurations, and it generally comprises suitable components necessary to receive, store and execute appropriate computer instructions or codes. The main components of the apparatus 1000 are a processing unit 1002 and a memory unit 1004.

The processing unit 1002 is a processor such as a CPU, an MCU or electronic circuitries including but not limited to application specific integrated circuits (ASIC), field programmable gate arrays (FPGA), and other programmable logic devices configured or programmed according to the teachings of the present disclosure.

The memory unit 1004 may include a volatile memory unit (such as RAM), a non-volatile unit (such as ROM, EPROM, EEPROM and flash memory) or both, or any type of media or devices suitable for storing instructions, codes, and/or data.

Preferably, the apparatus 1000 further includes one or more input devices 1006 such as a keyboard, a mouse, a stylus, a microphone, a tactile input device (e.g., touch sensitive screen) and a video input device (e.g., camera). The apparatus 1000 may further include one or more output devices 1008 such as one or more displays, speakers, disk drives, and printers. The displays may be a liquid crystal display, a light emitting display or any other suitable display that may or may not be touch sensitive. The apparatus 1000 may further include one or more disk drives 1012 which may encompass solid state drives, hard disk drives, optical drives and/or magnetic tape drives. A suitable operating system may be installed in the apparatus 1000, e.g., on the disk drive 1012 or in the memory unit 1004 of the apparatus 1000. The memory unit 1004 and the disk drive 1012 may be operated by the processing unit 1002.

The apparatus 1000 also preferably includes a communication module 1010 for establishing one or more communication links (not shown) with one or more other computing devices such as a server, personal computers, terminal nodes, wireless or handheld computing devices. The communication module 1010 may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data.

Preferably, the processing unit 1002, the memory unit 1004, and optionally the input devices 1006, the output devices 1008, the communication module 1010 and the disk drives 1012 are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the apparatus 1000 shown in FIG. 10 is merely exemplary, and that different apparatuses 1000 may have different configurations and still be applicable in the invention.

In some embodiments, the method in the invention may also be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others in the art to understand the invention for various embodiments and with various modifications that are suited to the particular use contemplated.

What is claimed is:

1. A computer-implemented method for method for planning regional connectivity of a cable network on a surface of the earth in a bounded closed region, comprising: modelling the surface of the earth in the bounded closed region as an irregular two-dimensional manifold comprising a plurality of grid nodes in a three-dimensional Euclidean space;
prespecifying a topology for the cable network;
modelling the prespecified topology as a Steiner tree including a plurality of terminal nodes representing a plurality of cable landing stations (CLSs) to be installed respectively in a plurality of destination regions connected by the cable network, a plurality of Steiner nodes presenting a plurality of branching units (BUs) to be installed in the cable network, and a plurality of edges connecting the terminal nodes and Steiner nodes;
finding a Steiner minimal tree (SMT) with the least cost in the Steiner tree;
returning coordinates of Steiner nodes of the SMT as locations of the BUS;
returning coordinates of terminal nodes of the SMT as locations of the CLSs; and
finding geodesics corresponding to edges of the SMT as cable paths between the BUs and CLSs;
wherein the SMT is found by:
defining a subtree consisted of only Steiner nodes and edges connecting the Steiner nodes to each other in the Steiner tree as a skeleton tree;
choosing an arbitrary Steiner node in the skeleton tree as a root node of the skeleton tree;
assigning an orientation to each of the edges toward to the root node; and
arranging the Steiner nodes in a topological order to obtain a sequence of the Steiner nodes so that children Steiner node of a given Steiner node appear in the sequence earlier than the given Steiner node;
associating each of the Steiner nodes with a subset of grid nodes;
constructing a directed acyclic graph (DAG) containing a plurality of directed paths, each consisted of grid nodes associated with different Steiner nodes and ended at a grid node associated with the root node; and
finding an optimal DAG with the least cost and returning the optimal DAG as the SMT; and
wherein the optimal DAG is found by applying a DAG-Least-Cost-System algorithm comprising:
initializing a plurality of minimum cumulative costs (MCCs) corresponding to the grid nodes associated with the Steiner nodes respectively;
updating a plurality of initialized MCCs for the grid nodes associated with the root node;
finding a grid node with the smallest MCC among the grid nodes associated with the root node as an optimal root node; and
returning the DAG containing the optimal root node as the optimal DAG.

2. The computer-implemented method according to claim 1, wherein each of the plurality of MCCs corresponding the grid nodes associated the Steiner nodes is initialized by:
determining if the Steiner node is a leaf node of the skeleton tree;
if the Steiner node is a leaf node of the skeleton tree, initializing a MCC for the grid node to be a sum of one or more minimum costs from neighboring terminal nodes to the grid node; and
if the Steiner node is not a leaf node of the skeleton tree, initializing a MCC for the grid node to be zero.

3. The computer-implemented method according to claim 2, wherein each of the minimum costs from neighboring terminal nodes to the grid node is obtained by applying a fast marching method comprising:
generating one or more potential paths from the neighboring terminal to the grid node;
calculating one or more costs for the one or more potential paths based on a cost model; and
returning the smallest cost as the minimum cost for from the neighboring terminal to the grid node; and
wherein the cost model is modelled with a set of cost factors includes cable laying cost, BU construction cost and CLS construction costs.

4. The computer-implemented method according to claim 3, wherein the plurality of initialized MCCs for the grid nodes associated with the root node are updated by performing a plurality of iteration in the topological order for each of the grid nodes associated with each of the Steiner nodes in the skeleton tree.

5. The computer-implemented method according to claim 4, wherein each of the iteration comprises:
determining if the Steiner node is a leaf node of the skeleton tree;
if the Steiner node is not a leaf node of the skeleton tree, updating the initialized MCC for the grid node associated with the Steiner node by adding one or more MCC increments, each derived from a grid node associated with a child node of the Steiner node.

6. The computer-implemented method according to claim 5, wherein each of the one or more MCC increments is derived by:
determining if the child node has the same location as the Steiner node;
if the child node has the same location as the Steiner node, determining the MCC increment to be equal to a MCC for the grid node associated with the child node;
if the child node has a different location from the Steiner node, determining the MCC increment to be equal to a sum of the MCC for the grid node associated with the child node and a BU construction cost at the grid node associated with the Steiner node.

7. The computer-implemented method according to claim 1, wherein the irregular two-dimensional manifold is a triangulated piecewise-linear two-dimensional manifold.

8. The computer-implemented method according to claim 1, wherein each Steiner nodes of the SMT have a number of branches equal or greater than three.

9. A non-transitory computer readable medium for storing computer instructions that, when executed by one or more processors, causes the one or more processors to perform a method for planning regional connectivity of a cable network on a surface of the earth in a bounded closed region, the method comprising:
modelling the surface of the earth in the bounded closed region as an irregular two-dimensional manifold comprising a plurality of grid nodes in a three-dimensional Euclidean space;
prespecifying a topology for the cable network;
modelling the prespecified topology as a Steiner tree including a plurality of terminal nodes representing a plurality of cable landing stations (CLSs) to be installed respectively in a plurality of destination regions connected by the cable network, a plurality of Steiner nodes presenting a plurality of branching units (BUs) to be installed in the cable network, and a plurality of edges connecting the terminal nodes and Steiner nodes;

finding a Steiner minimal tree (SMT) with the least cost in the Steiner tree;
returning coordinates of Steiner nodes of the SMT as locations of the BUS;
returning coordinates of terminal nodes of the SMT as locations of the CLSs; and
finding geodesics corresponding to edges of the SMT as cable paths between the BUs and CLSs;

wherein the SMT is found by:
defining a subtree consisted of only Steiner nodes and edges connecting the Steiner nodes to each other in the Steiner tree as a skeleton tree;
choosing an arbitrary Steiner node in the skeleton tree as a root node of the skeleton tree;
assigning an orientation to each of the edges toward to the root node; and
arranging the Steiner nodes in a topological order to obtain a sequence of the Steiner nodes so that children Steiner node of a given Steiner node appear in the sequence earlier than the given Steiner node;
associating each of the Steiner nodes with a subset of grid nodes;
constructing a directed acyclic graph (DAG) containing a plurality of directed paths, each consisted of grid nodes associated with different Steiner nodes and ended at a grid node associated with the root node; and
finding an optimal DAG with the least cost and returning the optimal DAG as the SMT; and wherein the optimal DAG is found by applying a DAG-Least-Cost-System algorithm comprising:
initializing a plurality of minimum cumulative costs (MCCs) corresponding to the grid nodes associated with the Steiner nodes respectively;
updating a plurality of initialized MCCs for the grid nodes associated with the root node;
finding a grid node with the smallest MCC among the grid nodes associated with the root node as an optimal root node; and
returning the DAG containing the optimal root node as the optimal DAG.

10. The non-transitory computer readable medium according to claim 9, wherein each of the plurality of MCCs corresponding the grid nodes associated the Steiner nodes is initialized by:
determining if the Steiner node is a leaf node of the skeleton tree;
if the Steiner node is a leaf node of the skeleton tree, initializing a MCC for the grid node to be a sum of one or more minimum costs from neighboring terminal nodes to the grid node; and
if the Steiner node is not a leaf node of the skeleton tree, initializing a MCC for the grid node to be zero.

11. The non-transitory computer readable medium according to claim 10, wherein each of the minimum costs from neighboring terminal nodes to the grid node is obtained by applying a fast marching method comprising:
generating one or more potential paths from the neighboring terminal to the grid node;
calculating one or more costs for the one or more potential paths based on a cost model; and
returning the smallest cost as the minimum cost for from the neighboring terminal to the grid node; and
wherein the cost model is modelled with a set of cost factors includes cable laying cost, BU construction cost and CLS construction costs.

12. The non-transitory computer readable medium according to claim 11, wherein the plurality of initialized MCCs for the grid nodes associated with the root node are updated by performing a plurality of iteration in the topological order for each of the grid nodes associated with each of the Steiner nodes in the skeleton tree.

13. The non-transitory computer readable medium according to claim 12, wherein each of the iteration comprises:
determining if the Steiner node is a leaf node of the skeleton tree;
if the Steiner node is not a leaf node of the skeleton tree, updating the initialized MCC for the grid node associated with the Steiner node by adding one or more MCC increments, each derived from a grid node associated with a child node of the Steiner node.

14. The non-transitory computer readable medium according to claim 13, wherein each of the one or more MCC increments is derived by:
determining if the child node has the same location as the Steiner node;
if the child node has the same location as the Steiner node, determining the MCC increment to be equal to a MCC for the grid node associated with the child node;
if the child node has a different location from the Steiner node, determining the MCC increment to be equal to a sum of the MCC for the grid node associated with the child node and a BU construction cost at the grid node associated with the Steiner node.

15. The non-transitory computer readable medium according to claim 9, wherein the irregular two-dimensional manifold is a triangulated piecewise-linear two-dimensional manifold.

16. The non-transitory computer readable medium according to claim 9, wherein each Steiner nodes of the SMT have a number of branches equal or greater than three.

* * * * *